(12) United States Patent
Bender et al.

(10) Patent No.: US 12,319,836 B2
(45) Date of Patent: Jun. 3, 2025

(54) INTUMESCENT FLAME-RETARDANT CLEARCOAT FORMULATIONS

(71) Applicant: CLARIANT INTERNATIONAL LTD, Muttenz (CH)

(72) Inventors: Klaus Bender, Vettweiss (DE); Harald Bauer, Kerpen (DE); Andreas Termath, Cologne (DE)

(73) Assignee: CLARIANT INTERNATIONAL LTD, Muttenz (CH)

( * ) Notice: Subject to any disclaimer, the term of this patent is extended or adjusted under 35 U.S.C. 154(b) by 658 days.

(21) Appl. No.: 17/637,851

(22) PCT Filed: Aug. 27, 2020

(86) PCT No.: PCT/EP2020/073929
§ 371 (c)(1),
(2) Date: Feb. 24, 2022

(87) PCT Pub. No.: WO2021/037955
PCT Pub. Date: Mar. 4, 2021

(65) Prior Publication Data
US 2022/0282097 A1    Sep. 8, 2022

(30) Foreign Application Priority Data
Aug. 30, 2019 (EP) .................... 19194702

(51) Int. Cl.
*C09D 5/18* (2006.01)
*C08K 5/053* (2006.01)
*C08K 5/521* (2006.01)
*C09D 161/24* (2006.01)
*C09D 161/28* (2006.01)

(52) U.S. Cl.
CPC .............. *C09D 5/185* (2013.01); *C08K 5/053* (2013.01); *C08K 5/521* (2013.01); *C09D 161/24* (2013.01); *C09D 161/28* (2013.01)

(58) Field of Classification Search
CPC .. C09D 5/185; C09D 161/20–32; C09D 5/18; C08K 5/521; C08K 5/523; C08K 5/053
See application file for complete search history.

(56) References Cited

U.S. PATENT DOCUMENTS

| | | | |
|---|---|---|---|
| 3,309,427 A | 3/1967 | Zech | |
| 3,873,471 A * | 3/1975 | Koberstein | B01J 23/34 |
| | | | 502/316 |
| 4,166,743 A | 9/1979 | Wortmann et al. | |
| 4,216,261 A * | 8/1980 | Dias | C09D 5/185 |
| | | | 442/139 |
| 5,387,655 A | 2/1995 | Aslin | |
| 5,596,029 A | 1/1997 | Goebelbecker | |
| 5,749,948 A | 5/1998 | Scholz et al. | |
| 6,204,325 B1 | 3/2001 | Maletzko | |
| 7,838,580 B2 | 11/2010 | Bauer et al. | |
| 9,085,734 B2 | 7/2015 | Hill et al. | |
| 2008/0121851 A1* | 5/2008 | Reinheimer | C08G 59/56 |
| | | | 252/606 |
| 2010/0256292 A1* | 10/2010 | Jakob | C09D 131/04 |
| | | | 524/556 |

FOREIGN PATENT DOCUMENTS

| | | |
|---|---|---|
| AT | A4562002 | 2/2003 |
| AT | 411040 B | 9/2003 |
| CA | 2137111 A1 * | 6/1995 |
| CA | 2310438 A1 * | 6/1996 |
| CN | 101970586 | 2/2011 |
| CN | 102164932 B | 10/2014 |
| CN | 105637041 | 6/2016 |
| CN | 108368232 | 8/2018 |
| CN | 109161332 | 1/2019 |
| DE | 4342972 A1 | 6/1995 |
| DE | 4343668 A1 | 6/1995 |
| DE | 4343669 A1 | 6/1995 |
| DE | 19751434 A1 | 7/1999 |
| DE | 10112155 | 9/2002 |
| DE | 102006058414 A1 | 6/2008 |
| DE | 102008063642 A1 | 6/2010 |
| EP | 1348542 A1 | 10/2003 |
| EP | 1935894 A1 | 6/2008 |
| EP | 2735578 | 5/2014 |
| JP | S4921432 A | 2/1974 |
| JP | S56151776 A | 11/1981 |
| JP | H0753900 A | 2/1995 |
| TW | 419514 B | 1/2001 |
| WO | 93/05118 A1 | 3/1993 |
| WO | 99/27021 A1 | 6/1999 |
| WO | 2012164478 A1 | 12/2012 |

OTHER PUBLICATIONS

Office Action dated Sep. 14, 2022, issued in corresponding Chinese Patent Application No. 202080060282.8.
International Search Report and Written Opinion dated Oct. 7, 2020, issued in corresponding International Patent Application No. PCT/EP2020/073929.
Bhatnagar et al., "Fire retardant clear coatings", Paintindia 32 (1), 3-6 and 14 (1982).
Troitzsch, "International Plastics Flammability Handbook", 2nd edition, Oxford University Press, New York, 1990, pp. 52 and 53.
Rompp Chemie Lexikon, 9th edition 1992, p. 1237.
Bhatnagar et al., "Clear Intumescent Fire Retardant Coating Consisting of Chlorinated Paraffins and Polyurethanes", Fire Safety Journal 4(3), 163-7 (1981/82).

* cited by examiner

*Primary Examiner* — Kregg T Brooks

(57) ABSTRACT

The invention relates to intumescent flame-retardant clearcoat formulations containing 20% to 88.5% by weight of an aqueous synthetic resin formulation, 10% to 60% by weight of a phosphoric partial ester, 0.5% to 20% by weight of a polyol and 1% to 30% by weight of further ingredients, and to the use thereof.

20 Claims, No Drawings

INTUMESCENT FLAME-RETARDANT CLEARCOAT FORMULATIONS

The invention relates to intumescent flame-retardant clearcoat formulations and to the use thereof.

Intumescent flame retardants act through the formation of an expanded insulating layer of flame-retardant material that forms under the action of heat, which protects the material to be protected from ingress of oxygen and/or overheating and hence prevents or delays the inflammation of combustible material or prevents or at least delays the changes in the mechanical and static properties of load-bearing components through the action of heat.

There are known flame-retardant coatings based on solvent-containing binders that contain chloroparaffins as flame-retardant component (Bhatnagar and Vergnaud in "Fire Safety Journal" 4(3), 163-7 and "Paintindia" 32 (1) 3-6, 14, 1982).

A drawback of these systems is that solvent vapors are released during drying, and corrosive and toxic halogen-containing combustion gases are released in the event of fire.

U.S. Pat. No. 4,166,743 discloses expandable coatings consisting of a film former, an ammonium polyphosphate, at least one substance that carbonizes under the action of heat, a dispersant, a salt having water of crystallization, a blowing agent and optionally fillers. The film formers used here may be aqueous dispersions of polyvinyl acetate or of a copolymer of vinyl acetate and dibutyl maleate, while suitable carbonizing substances are dicyandiamide, pentaerythritol or melamine. Dispersants mentioned are ethyl acetate, butyl acetate, xylene or toluene, and blowing agents mentioned are chloroparaffins.

According to Troitzsch ("International Plastics Flammability Handbook", 2nd edition, Oxford University Press, New York, 1990, pages 52 and 53), typical representatives of carbonizing substances are pentaerythritol and starch, while guanidines, melamine and chloroparaffins are among the blowing agents. A disadvantage of the aforementioned expandable coatings is that they contain organically bound halogen in the blowing agent and/or in the substance that carbonizes under the action of heat, which results in the release of corrosive and toxic gases in the breakdown of the coating.

The aforementioned systems are therefore often unusable in practice owing to the release of gases and dust that endanger life.

Furthermore, DE-A-4343668 describes expandable, flame-retardant coatings consisting of a film-forming binder, ammonium polyphosphate, at least one substance that carbonizes under the action of heat, a blowing agent and optionally dispersants and fillers.

DE-A-4343669 describes expandable flame-retardant coatings of similar composition, but these do not contain ammonium polyphosphate.

However, the present systems achieve only relatively short and often inadequate service lives (fire resistance times).

Also known are water-based compositions having intumescent properties, in which phosphoric partial esters based on polyols act as acid donors and carbonizing substances (WO-A-1993005118).

A disadvantage here is that the present systems achieve only inadequate coating properties, for instance excessively slow curing, remaining residual tack and excessively high moisture sensitivity. Service lives achievable are only in the range of minutes and hence much too short for practical use.

Finally, DE-A-19751434 describes mixtures of at least two different monoalkyl phosphates and dialkyl phosphates which, in combination with amino resins, are said to be capable of producing fire protection coatings that dry transparently.

What are obtained here are tacky coatings with an inadequate application profile that do not cure through completely, and are practically unusable.

The existing prior art leads to formulations that all still have disadvantages. Some formulations contain halogen and release toxic and corrosive gases in the event of fire. In the case of the halogen-free systems, service lives are very short, and inadequate curing of the product is achieved in some cases. There are also problems in industrial production with some systems; the scope of application is too small with others.

It is therefore an object of the present invention to provide intumescent clearcoat formulations that are halogen-free and show adequate service lives, and form cured products without addition of further (curing) substances. Furthermore, the clearcoat formulations of the invention are to show transparency after application to the material to be coated.

This object is achieved by intumescent flame-retardant clearcoat formulations of the type described at the outset, containing 20% to 88.5% by weight of an aqueous synthetic resin formulation, 10% to 60% by weight of a phosphoric partial ester, 0.5% to 20% by weight of a polyol and 1% to 30% by weight of further ingredients.

The intumescent flame-retardant clearcoat formulations preferably contain 30% to 75% by weight of an aqueous synthetic resin formulation, 20% to 50% by weight of a phosphoric partial ester, 3% to 15% by weight of a polyol and 2% to 20% by weight of further ingredients.

The intumescent flame-retardant clearcoat formulations more preferably contain 40% to 60% by weight of an aqueous synthetic resin formulation, 30% to 40% by weight of a phosphoric partial ester, 5% to 10% by weight of a polyol and 5% to 15% by weight of further ingredients.

The polyol is preferably pentaerythritol, dipentaerythritol, tripentaerythritol and/or polycondensates of pentaerythritol and/or mixtures of pentaerythritol-based esters, glycerol, oligomeric glycerol, xylitol, sorbitol, mannitol, isomalt, lactitol, glucitol, threitol, erythritol, arabitol, inositol, glucosamine, polyvinyl acetate, polyvinyl alcohol and ethylene oxide-propylene oxide polyols.

The polyol is preferably sorbitol.

The phosphoric partial ester is preferably a composition corresponding to a mixture of mono- and diesters of orthophosphoric acid with one or more polyols, where the average hydroxyl group content of these polyols is at least 40% by weight, the molar monoester/diester ratio does not exceed 12:1 and the phosphorus content of the mixture is at least 10% by weight.

The phosphoric partial ester is more preferably a composition corresponding to a mixture of optionally carboxylic anhydride-modified mono- and diesters of orthophosphoric acid with one or more polyols, where the average hydroxyl group content of these polyols is at least 40% by weight, the molar monoester/diester ratio does not exceed 12:1 and the phosphorus content of the mixture is at least 10% by weight.

The aqueous synthetic resin formulation is preferably a nitrogen-containing synthetic resin formulation.

The aqueous synthetic resin formulation is preferably a melamine-formaldehyde resin and/or a urea-formaldehyde resin.

The aqueous synthetic resin formulation is more preferably an etherified melamine-formaldehyde resin and/or etherified urea-formaldehyde resin.

Further ingredients are preferably dispersants, fillers, curing agents, thixotropic agents, plasticizers, acid donors, further flame retardants, surface auxiliaries and/or binders.

The phosphorus content of the intumescent flame-retardant clearcoat formulation after curing is 1% to 15% by weight.

The phosphorus content of the intumescent flame-retardant clearcoat formulation after curing is preferably 5% to 10% by weight.

The invention also relates to an intumescent flame-retardant clearcoat formulation as claimed in at least one of claims 1 to 12, which is transparent after application and drying.

The intumescent flame-retardant clearcoat formulation of the invention is preferably halogen-free.

The invention also relates to the use of the clearcoat formulation of the invention for production of coatings of articles made of wood, wood materials, veneers, plastics, building materials, cellulose materials, rubber, metal and other materials, fabrics made of synthetic or natural fibers, and for impregnation of textiles and leathers and as an intumescent coating on polyolefins and as solder mask.

The phosphoric partial ester preferably derives from at least 2 and especially from 2 to 4 polyols having an average hydroxyl group content (calculated as the molecular weight of the hydroxyl groups divided by the total molecular weight of the polyols times 100%) of at least 40% by weight, preferably at least 45% by weight. It is also possible to use one or more polyols having a hydroxyl group content below 40% by weight in the polyol mixtures, in which case preferably not more than 15% of all polyol hydroxyl groups present originate from such polyols.

The phosphoric partial ester may correspond to the phosphoric esters specified in DE4342972A1, or else mixtures of these esters with other phosphoric esters.

The aforementioned melamine resins used in accordance with the invention are typically reaction products of melamine with formaldehyde in a molar ratio of 1:1 to 1:6 (melamine:formaldehyde).

The melamine-formaldehyde resins may also have been etherified with alcohols having a chain length of 1 to 20 carbon atoms.

Further possible carbon sources also include starch-like compounds, e.g. starch and modified starch, and/or polyhydric alcohols such as saccharides and polysaccharides, and/or a thermoplastic or thermoset polymeric resin binder, such as a polyvinyl alcohol, phenolic resin, etc.

The clearcoat formulations of the invention are typically used in the form of a fire protection coating (intumescent coating) as a paintable, sprayable or rollable paint for protection of a wide variety of different substrates, preferably steel beams and columns, roofs, walls, cables, pipes, cable ducts, cables and combination bulkheads, doors, curtains, smoke curtains, blinds, safety cabinets, installation cabinets and other articles/materials.

The fire protection coating of the invention is also suitable for constructive fire protection of hollow profiles and H-profiles, in workshop applications and for areas in which elevated stability to weathering is required.

Without the use of colorants, the intumescent flame-retardant clearcoat formulations of the invention are typically clear (transparent) in the form of a coating. They are also typically used as such. By adding fillers, especially talc and others, however, it is also possible to make the coating cloudy.

It is likewise possible, by choice of a suitable colorant, especially the inorganic pigments, to produce intumescent flame-retardant coatings that are colored, preferably white, in the dry state.

Colorants in the context of the invention are understood to mean those as specified, for example, in Römpp's Chemie Lexikon, 9th edition 1992, page 1237. This includes inorganic and organic, natural and synthetic colorants such as pigments and dyes.

The further ingredients are more preferably thixotropic agents and/or fillers.

The clearcoat formulation can be applied in any conventional manner, for example by spraying, dipping, drawing and painting. The coating operation can optionally be repeated more than once. The coating thicknesses may be varied within a wide range depending on the viscosity of the composition and the substrate to be coated. Typical layer thicknesses are in the range from 10 µm to 3 mm.

The composition (the coating) is preferably cured at room temperature, although curing can also be effected at elevated temperatures depending on the nature of the components used.

The invention is elucidated by the examples which follow, in which the following substances were used:

Maprenal® MF 920w/75WA (INEOS Melamines GmbH, Frankfurt, Germany): very high-reactivity melamine-formaldehyde resin triply etherified with methanol and containing imino groups.

Maprenal® MF 921w/85WA (INEOS Melamines GmbH, Frankfurt, Germany): high-reactivity melamine-formaldehyde resin quadruply etherified with methanol and containing imino groups.

Resimene® AQ-2610 (INEOS Melamines GmbH, Frankfurt, Germany): high-reactivity melamine-formaldehyde resin quadruply etherified with methanol and containing imino groups.

Resimene® 757 (INEOS Melamines GmbH, Frankfurt, Germany): high-reactivity melamine-formaldehyde resin quintuply etherified with methanol and n-butanol in a ratio of 75/25 and containing imino groups.

Resimene® 764 (INEOS Melamines GmbH, Frankfurt, Germany): high-reactivity melamine-formaldehyde resin quintuply etherified with methanol and n-butanol in a ratio of 10/90 and containing imino groups.

Primere® 70 0867L (Metadynea, Krems, Austria): high-reactivity melamine-formaldehyde resin etherified with methanol and containing imino groups.

Exolit® AP 422 (Clariant Plastics & Coatings (Germany) GmbH, Frankfurt am Main):

free-flowing, pulverulent ammonium polyphosphate of sparing water solubility, of the formula $(NH_4PO_3)_n$ with n=20 to 1000, especially 500 to 1000. The proportion of particles having a particle size smaller than 45 µm is more than 99%.

Exolit® 855 (Clariant Plastics & Coatings (Germany) GmbH, Frankfurt am Main): flame retardant (partial ester of polyphosphoric acid and polyols).

Budit® 380 (Chemische Fabrik Budenheim, Budenheim, Germany): flame retardant (partial ester of phosphoric acid and pentaerythritol).

Sorbitol® (Biesterfeld AG, Hamburg): carbon-forming substance.

Glycerol® (Syskem Chemie GmbH, Wuppertal): carbon-forming substance.

Inosit® (Brenntag GmbH, Mülheim an der Ruhr): carbon-forming substance.

Genamin® Gluco 50 (N,N-dimethyl-D-glucamine) (Clariant SE International): carbon-forming substance.

Aerosil® 380 (Evonik SE, Germany): thixotropic agent.

Chinafill® 100, (Amberger Kaolinwerke, Hirschau): filler.

p-toluenesulfonic acid (INEOS Melamines GmbH, Frankfurt): curing component.

Byk 333® (Byk Wesel, Germany): silicone-containing surface additive.

Hypersal XT 782 (INEOS Melamines GmbH, Frankfurt): anionic surface additive.

The intumescent formulations—which were then later applied as intumescent coating—were produced as follows:

a) Formulation part 1

The filler is dispersed in an initial charge of the melamine resin or melamine resin mixture (here, for example, the aforementioned melamine-formaldehyde resins) at room temperature while stirring, and the carbon-forming substance is likewise metered in while stirring.

b) Formulation part 2

The curing component and the surface-active substance are added to an initial charge of the liquid flame retardant at room temperature while stirring, then the auxiliaries and additives (e.g. titanium dioxide, fibers and fillers) are incorporated while stirring at low speed.

Formulation parts 1 and 2 are each dispensed separately and are each storage-stable over relatively long periods of time (longer than 1 year).

For intumescent coating of building materials, the part-formulations are mixed in a container in a ratio of 1:1 (in each case of formulation part 1 and formulation part 2) while stirring. The resultant mixture is processible for up to 4 hours. Application to the substrate to be coated can be effected by brush or roller or by means of spraying technology.

The aforementioned intumescent flame-retardant formulation cures at room temperature within 12 hours to give a transparent and hard coating. The curing reaction can be accelerated by increasing the drying temperature.

The invention is illustrated by the examples which follow (pbw=parts by weight).

EXAMPLE 1 (COMPARATIVE)

| | |
|---|---|
| 47.90 pbw | Maprenal ® MF 920w/75WA |
| 32.65 pbw | Budit ® 380 |
| 9.23 pbw | 70% sorbitol solution in water |
| 7.38 pbw | Chinafill 100 |
| 2.34 pbw | p-toluenesulfonic acid |
| 0.5 pbw | BYK 333 |

EXAMPLE 2

| | |
|---|---|
| 47.90 pbw | Maprenal ® MF 920w/75WA |
| 32.65 pbw | Exolit ® 855 |
| 9.23 pbw | 70% sorbitol solution in water |
| 7.38 pbw | Chinafill 100 |
| 2.34 pbw | p-toluenesulfonic acid |
| 0.5 pbw | BYK 333 |

EXAMPLE 3

| | |
|---|---|
| 47.90 pbw | Maprenal ® MF 920w/75WA |
| 32.65 pbw | Exolit ® 855 |
| 9.23 pbw | 70% sorbitol solution in water |
| 5.38 pbw | Chinafill 100 |
| 2.0 pbw | Exolit AP 422 |
| 2.34 pbw | p-toluenesulfonic acid |
| 0.5 pbw | BYK 333 |

EXAMPLE 4

| | |
|---|---|
| 47.90 pbw | Maprenal ® MF 920w/75WA |
| 32.65 pbw | Exolit ® 855 |
| 9.23 pbw | 70% sorbitol solution in water |
| 4.38 pbw | Chinafill 100 |
| 3.00 pbw | Exolit AP 422 |
| 2.34 pbw | p-toluenesulfonic acid |
| 0.5 pbw | BYK 333 |

EXAMPLE 5

| | |
|---|---|
| 47.90 pbw | Maprenal ® MF 920w/75WA |
| 32.65 pbw | Exolit ® 855 |
| 9.23 pbw | 70% sorbitol solution in water |
| 3.38 pbw | Chinafill 100 |
| 4.00 pbw | Exolit AP 422 |
| 2.34 pbw | p-toluenesulfonic acid |
| 0.5 pbw | BYK 333 |

EXAMPLE 6

| | |
|---|---|
| 47.90 pbw | Maprenal ® MF 920w/75WA |
| 32.65 pbw | Exolit ® 855 |
| 9.23 pbw | 70% glycerol solution in water |
| 7.38 pbw | Chinafill 100 |
| 2.34 pbw | p-toluenesulfonic acid |
| 0.5 pbw | BYK 333 |

EXAMPLE 7

| | |
|---|---|
| 47.90 pbw | Maprenal ® MF 920w/75WA |
| 32.65 pbw | Exolit ® 855 |
| 9.23 pbw | 70% inositol solution in water |
| 7.38 pbw | Chinafill 100 |
| 2.34 pbw | p-toluenesulfonic acid |
| 0.5 pbw | BYK 333 |

TABLE 1

| Name | Example 1 (comparative) | 2 | 3 | 4 | 5 | 6 | 7 |
|---|---|---|---|---|---|---|---|
| Amounts and type of aqueous synthetic resin formulation (melamine-formaldehyde resin) | 47.90 pbw Maprenal ® MF 920w/75WA | 47.90 pbw Maprenal ® MF 920w/75WA | 47.90 pbw Maprenal ® MF 920w/75WA | 47.90 pbw Maprenal ® MF 920w/75WA | 47.90 pbw Maprenal ® MF 920w/75WA | 47.90 pbw Maprenal ® MF 920w/75WA | 47.90 pbw Maprenal ® MF 920w/75WA |
| Foam-forming substance (partial phosphoric ester) | 32.65 pbw Budit 380 | 32.65 pbw Exolit 855 | 32.65 pbw Exolit 855 | 32.65 pbw Exolit 855 | 32.65 pbw Exolit 855 | 32.65 pbw Exolit 855 | 32.65 pbw Exolit 855 |
| Foam-forming substance (ammonium polyphosphate) | 0 pbw Exolit AP 422 | 0 pbw Exolit AP 422 | 2.0 pbw Exolit AP 422 | 3.0 pbw Exolit AP 422 | 4.0 pbw Exolit AP 422 | 0 pbw Exolit AP 422 | 0 pbw Exolit AP 422 |
| Carbon-forming substance (carbohydrates) | 9.23 pbw sorbitol | 9.23 pbw sorbitol | 9.23 pbw sorbitol | 9.23 pbw sorbitol | 9.23 pbw sorbitol | 9.23 pbw glycerol | 9.23 pbw inositol |
| Reaction accelerator | 2.34 pbw p-toluene-sulfonic acid | 2.34 pbw p-toluene-sulfonic acid | 2.34 pbw p-toluene-sulfonic acid | 2.34 pbw p-toluene-sulfonic acid | 2.34 pbw p-toluene-sulfonic acid | 2.34 pbw p-toluene-sulfonic acid | 2.34 pbw p-toluene-sulfonic acid |
| Modifier | 7.38 pbw Chinafill | 7.38 pbw Chinafill | 5.38 pbw Chinafill | 4.38 pbw Chinafill | 3.38 pbw Chinafill | 7.38 pbw Chinafill | 7.38 pbw Chinafill |
| Surface additive | 0.5 pbw BYK 333 | 0.5 pbw BYK 333 | 0.5 pbw BYK 333 | 0.5 pbw BYK 333 | 0.5 pbw BYK 333 | 0.5 pbw BYK 333 | 0.5 pbw BYK 333 | pbw = parts by weight

EXAMPLE 8

| | |
|---|---|
| 47.90 pbw | Maprenal ® MF 921w/85WA |
| 32.65 pbw | Exolit ® 855 |
| 9.23 pbw | 70% sorbitol solution in water |
| 7.38 pbw | Chinafill 100 |
| 2.34 pbw | p-toluenesulfonic acid |
| 0.5 pbw | BYK 333 |

EXAMPLE 9

| | |
|---|---|
| 32.90 pbw | Maprenal ® MF 921w/85WA |
| 15.00 pbw | Maprenal ® MF 920w/75WA |
| 32.65 pbw | Exolit ® 855 |
| 9.23 pbw | 70% sorbitol solution in water |
| 7.38 pbw | Chinafill 100 |
| 2.34 pbw | p-toluenesulfonic acid |
| 0.5 pbw | BYK 333 |

EXAMPLE 10

| | |
|---|---|
| 15.00 pbw | Maprenal ® MF 921w/85WA |
| 32.90 pbw | Maprenal ® MF 920w/75WA |
| 32.65 pbw | Exolit ® 855 |
| 9.23 pbw | 70% sorbitol solution in water |
| 7.38 pbw | Chinafill 100 |
| 2.34 pbw | p-toluenesulfonic acid |
| 0.5 pbw | BYK 333 |

EXAMPLE 11

| | |
|---|---|
| 47.90 pbw | Resimene ® AQ-2610 |
| 32.65 pbw | Exolit ® 855 |
| 9.23 pbw | 70% sorbitol solution in water |
| 7.38 pbw | Chinafill 100 |
| 2.34 pbw | p-toluenesulfonic acid |
| 0.5 pbw | BYK 333 |

EXAMPLE 12

| | |
|---|---|
| 15.00 pbw | Maprenal ® MF 921w/85WA |
| 32.90 pbw | Resimene ® AQ-2610 |
| 32.65 pbw | Exolit ® 855 |
| 9.23 pbw | 70% sorbitol solution in water |
| 7.38 pbw | Chinafill 100 |
| 2.34 pbw | p-toluenesulfonic acid |
| 0.5 pbw | BYK 333 |

EXAMPLE 13

| | |
|---|---|
| 32.90 pbw | Maprenal ® MF 921w/85WA |
| 15.00 pbw | Resimene ® AQ-2610 |
| 32.65 pbw | Exolit ® 855 |
| 9.23 pbw | 70% sorbitol solution in water |
| 7.38 pbw | Chinafill 100 |
| 2.34 pbw | p-toluenesulfonic acid |
| 0.5 pbw | BYK 333 |

EXAMPLE 14

| | |
|---|---|
| 47.90 pbw | Primere ® 70 0867L |
| 32.65 pbw | Exolit ® 855 |
| 9.23 pbw | 70% sorbitol solution in water |
| 7.38 pbw | Chinafill 100 |
| 2.34 pbw | p-toluenesulfonic acid |
| 0.5 pbw | BYK 333 |

TABLE 2

| Name | Example 8 | Example 9 | Example 10 | Example 11 |
|---|---|---|---|---|
| Amounts and type of film-forming binder and blowing agent (melamine-formaldehyde resin) | 47.90 pbw Maprenal ® MF 921w/85WA | 15 pbw Maprenal ® MF 920w/75WA 32.90 pbw Maprenal ® MF 921w/85WA | 32.90 pbw Maprenal ® MF 920w/75WA 15 pbw Maprenal ® MF 921w/85WA | 47.90 pbw Resimene ® AQ-2610 |
| Foam-forming substance (partial phosphoric ester) | 32.65 pbw Exolit 855 | 32.65 pbw Exolit 855 | 32.65 pbw Exolit 855 | 32.65 pbw Exolit 855 |
| Foam-forming substance (ammonium polyphosphate) | 0 pbw Exolit AP 422 | 0 pbw Exolit AP 422 | 0 pbw Exolit AP 422 | 0 pbw Exolit AP 422 |
| Carbon-forming substance (carbohydrates) | 9.23 pbw sorbitol | 9.23 pbw sorbitol | 9.23 pbw sorbitol | 9.23 pbw sorbitol |
| Reaction accelerator | 2.34 pbw p-toluene-sulfonic acid | 2.34 pbw p-toluene-sulfonic acid | 2.34 pbw p-toluene-sulfonic acid | 2.34 pbw p-toluene-sulfonic acid |
| Modifier | 7.38 pbw Chinafill | 7.38 pbw Chinafill | 7.38 pbw Chinafill | 7.38 pbw Chinafill |
| Surface additive | 0.5 pbw BYK 333 | 0.5 pbw BYK 333 | 0.5 pbw BYK 333 | 0.5 pbw BYK 333 |

| Name | Example 12 | Example 13 | Example 14 |
|---|---|---|---|
| Amounts and type of film-forming binder and blowing agent (melamine-formaldehyde resin) | 15 pbw Maprenal ® MF 920w/75WA 32.90 pbw Resimene ® AQ-2610 | 32.90 Maprenal ® MF 920w/75WA 15 pbw Resimene ® AQ-2610 | 47.90 pbw Primere ® 70 0867L |
| Foam-forming substance (partial phosphoric ester) | 32.65 pbw Exolit 855 | 32.65 pbw Exolit 855 | 32.65 pbw Exolit 855 |
| Foam-forming substance (ammonium polyphosphate) | 0 pbw Exolit AP 422 | 0 pbw Exolit AP 422 | 0 pbw Exolit AP 422 |
| Carbon-forming substance (carbohydrates) | 9.23 pbw sorbitol | 9.23 pbw sorbitol | 9.23 pbw sorbitol |
| Reaction accelerator | 2.34 pbw p-toluene-sulfonic acid | 2.34 pbw p-toluene-sulfonic acid | 2.34 pbw p-toluene-sulfonic acid |
| Modifier | 7.38 pbw Chinafill | 7.38 pbw Chinafill | 7.38 pbw Chinafill |
| Surface additive | 0.5 pbw BYK 333 | 0.5 pbw BYK 333 | 0.5 pbw BYK 333 | pbw = parts by weight

EXAMPLE 15

| 47.90 pbw | Maprenal ® MF 920w/75WA |
|---|---|
| 41.88 pbw | Exolit ® 855 |
| 0.00 pbw | 70% sorbitol solution in water |
| 7.38 pbw | Chinafill 100 |
| 2.34 pbw | p-toluenesulfonic acid |
| 0.5 pbw | Hypersal XT 782 |

EXAMPLE 16

| 47.90 pbw | Maprenal ® MF 920w/75WA |
|---|---|
| 27.65 pbw | Exolit ® 855 |
| 14.23 pbw | 70% sorbitol solution in water |
| 7.38 pbw | Chinafill 100 |
| 2.34 pbw | p-toluenesulfonic acid |
| 0.5 pbw | Hypersal XT 782 |

EXAMPLE 17

| 37.90 pbw | Maprenal ® MF 920w/75WA |
|---|---|
| 42.65 pbw | Exolit ® 855 |
| 9.23 pbw | 70% sorbitol solution in water |
| 7.38 pbw | Chinafill 100 |
| 2.34 pbw | p-toluenesulfonic acid |
| 0.5 pbw | Hypersal XT 782 |

EXAMPLE 18 (COMPARATIVE)

| 57.90 pbw | Maprenal ® MF 920w/75WA |
|---|---|
| 12.65 pbw | Exolit ® 855 |
| 9.23 pbw | 70% sorbitol solution in water |
| 7.38 pbw | Chinafill 100 |
| 2.34 pbw | p-toluenesulfonic acid |
| 0.5 pbw | BYK 333 |

EXAMPLE 19

| | |
|---|---|
| 47.90 pbw | Maprenal ® MF 920w/75WA |
| 32.65 pbw | Exolit ® 855 |
| 9.23 pbw | Genamin ® Gluco 50 |
| 7.38 pbw | Chinafill 100 |
| 2.34 pbw | p-toluenesulfonic acid |
| 0.5 pbw | BYK 333 |

EXAMPLE 20

| | |
|---|---|
| 47.90 pbw | Maprenal ® MF 920w/75WA |
| 32.65 pbw | Exolit ® 855 |
| 4.00 pbw | 70% sorbitol solution in water |
| 5.23 pbw | Genamin ® Gluco 50 |
| 7.38 pbw | Chinafill 100 |
| 2.34 pbw | p-toluenesulfonic acid |
| 0.5 pbw | BYK 333 |

EXAMPLE 21

| | |
|---|---|
| 47.90 pbw | Maprenal ® MF 920w/75WA |
| 32.65 pbw | Exolit ® 855 |
| 5.23 pbw | 70% sorbitol solution in water |
| 4.00 pbw | Genamin ® Gluco 50 |
| 7.38 pbw | Chinafill 100 |
| 2.34 pbw | p-toluenesulfonic acid |
| 0.5 pbw | BYK 333 |

Testing of the quality of the clearcoat formulations of the invention with regard to heat emission rate and transparency Materials that are used on board rail vehicles and are applied to vertical surfaces indoors and to other surfaces must meet corresponding demands with regard to heat emission rate under the action of thermal radiation. The heat emission rate is ascertained by irradiating a specimen in a horizontal position. The procedure of testing and assessment of the results is based on standards ISO 5660-1 and DIN EN 45545-2.

The assessment criterion according to EN45545-2 for tests on a cone calorimeter is the MARHE value. This is the maximum of the average heat emission rate over the period of the measurement and is ascertained as the average from 3 individual tests. The MARHE value gives the corresponding hazard level (HL2<90 kW/m$^2$; HL3<60 kW/m$^2$).

An amount of 400 g/m$^2$ of each intumescent formulation thus produced was applied to a solid spruce board (100× 100×20 mm) and subjected to a heat emission test to ISO 5660-1 (cone calorimeter test). The MARHE value indicates the heat emission rate based on surface area (kW/m$^2$) under the chosen test parameters. The lower the heat emission, the better the insulating effect of the intumescent coating.

Transparency

The ability of material to transmit light waves is referred to as transparency. A material is described as transparent if it is transparent to visible light having a wavelength in the range from 380 nanometres (nm) to 780 nm. Thus, a material, for instance window glass, is described as being transparent if it is possible to see what lies behind it relatively clearly. This is also true within the scope of the invention.

This gave the test results shown in table 4.

TABLE 4

| Intumescent formulation from | MARHE value (kW/m$^2$) | Visual test* Grade |
|---|---|---|
| Blank: uncoated spruce wood | 148 | |
| Example 1 (comparative) | 75 | 5 |
| Example 2 | 33 | 1 |

TABLE 3

| | Example | | | | | | |
|---|---|---|---|---|---|---|---|
| Name | 15 | 16 | 17 | 18 (comparative) | 19 | 20 | 21 |
| Amounts and type of film-forming binder and blowing agent (melamine-formaldehyde resin) | 47.90 pbw Maprenal ® MF 920w/75WA | 47.90 pbw Maprenal ® MF 920w/75WA | 37.90 Maprenal ® MF 920w/75WA | 57.90 Maprenal ® MF 920w/75WA | 47.90 pbw Maprenal ® MF 920w/75WA | 47.90 pbw Maprenal ® MF 920w/75WA | 47.90 pbw Maprenal ® MF 920w/75WA |
| Foam-forming substance (partial phosphoric ester) | 41.88 pbw Exolit 855 | 27.65 pbw Exolit 855 | 42.65 pbw Exolit 855 | 12.65 pbw Exolit 855 | 32.65 pbw Exolit 855 | 32.65 pbw Exolit 855 | 32.65 pbw Exolit 855 |
| Foam-forming substance (ammonium polyphosphate) | 0 pbw Exolit AP 422 | 0 pbw Exolit AP 422 | 0 pbw Exolit AP 422 | 0 pbw Exolit AP 422 | 0 pbw Exolit AP 422 | 0 pbw Exolit AP 422 | 0 pbw Exolit AP 422 |
| Carbon-forming substance (carbohydrates)/amino alcohol | 0 pbw sorbitol | 14.23 pbw sorbitol | 9.23 pbw sorbitol | 9.23 pbw sorbitol | 9.23 pbw Genamin Gluco 50 | 4.0 pbw sorbitol 5.23 pbw Genamin Gluco 50 | 5.23 pbw sorbitol 4.0 pbw Genamin Gluco 50 |
| Reaction accelerator | 2.34 pbw p-toluene-sulfonic acid | 2.34 pbw p-toluene-sulfonic acid | 2.34 pbw p-toluene-sulfonic acid | 2.34 pbw p-toluene-sulfonic acid | 2.34 pbw p-toluene-sulfonic acid | 2.34 pbw p-toluene-sulfonic acid | 2.34 pbw p-toluene-sulfonic acid |
| Modifier | 7.38 pbw Chinafill | 7.38 pbw Chinafill | 7.38 pbw Chinafill | 7.38 pbw Chinafill | 7.38 pbw Chinafill | 7.38 pbw Chinafill | 7.38 pbw Chinafill |
| Surface additive | 0.5 pbw Hypersal XT 782 | 0.5 pbw Hypersal XT 782 | 0.5 pbw Hypersal XT 782 | 0.5 pbw BYK 333 | 0.5 pbw BYK 333 | 0.5 pbw BYK 333 | 0.5 pbw BYK 333 | pbw = parts by weight

TABLE 4-continued

| Intumescent formulation from | MARHE value (kW/m²) | Visual test* Grade |
| --- | --- | --- |
| Example 3 | 4 | 2 |
| Example 4 | 4 | 2 |
| Example 5 | 5 | 3 |
| Example 9 | 62 | 2 |
| Example 10 | 66 | 1 |
| Example 11 | 70 | 2 |
| Example 14 | 68 | 2 |
| Example 15 | 71 | 1 |
| Example 3 | 45 | 2 |
| Example 18 (comparative) | 80 | 5 |
| Example 19 | 40 | 2 |

*For the visual test, the respective intumescent formulation is applied in defined layer thickness to a test chart for visual assessment of hiding capacity to ISO 6504-3.

The assessment is made by a German school grade system, where grade 1 means "highest transparency, no haze" down to grade 6: "low transparency, significant haze").

The clearcoat formulations of the invention using phosphoric partial esters (Exolit® 855 here) are all transparent and therefore of excellent suitability for production of effective transparent intumescent coatings.

In addition, the clearcoat formulations of the invention have only low heat emissions, as apparent from the MARHE values. Thus, the clearcoat formulations of the invention in the form of an intumescent coating have a good insulating effect.

The invention claimed is:

1. An intumescent flame-retardant clearcoat formulation comprising
   30% to 75% by weight of an aqueous synthetic resin formulation,
   20% to 50% by weight of a phosphoric partial ester,
   3% to 15% by weight of at least one polyol, and
   2% to 20% by weight of further ingredients,
wherein the phosphoric partial ester is a partial ester of polyphosphoric acid and at least 2 polyols, the polyols having an average hydroxyl group content of at least 40% by weight, calculated as the ratio of hydroxyl group molecular weight to total polyol molecular weight multiplied by 100%.

2. The intumescent flame-retardant clearcoat formulation according to claim 1, containing
   40% to 60% by weight of the aqueous synthetic resin formulation,
   30% to 40% by weight of the phosphoric partial ester,
   5% to 10% by weight of the at least one polyol, and
   5% to 15% by weight of the further ingredients.

3. The intumescent flame-retardant clearcoat formulation according to claim 1, wherein the at least one polyol is selected from pentaerythritol, dipentaerythritol, tripentaerythritol, polycondensates of pentaerythritol, mixtures of pentaerythritol-based esters, glycerol, oligomeric glycerol, xylitol, sorbitol, mannitol, isomalt, lactitol, glucitol, threitol, erythritol, arabitol, inositol, polyvinyl alcohol, ethylene oxide-propylene oxide polyols, and mixtures of these.

4. The intumescent flame-retardant clearcoat formulation according to claim 1, wherein the at least one polyol is sorbitol.

5. The intumescent flame-retardant clearcoat formulation according to claim 1, wherein the phosphoric partial ester is a partial ester of polyphosphoric acid and at least 2 polyols, the polyols having an average hydroxyl group content of at least 45% by weight, calculated as the ratio of hydroxyl group molecular weight to total polyol molecular weight multiplied by 100%.

6. The intumescent flame-retardant clearcoat formulation according to claim 1, wherein the aqueous synthetic resin formulation is a nitrogen-containing synthetic resin formulation.

7. The intumescent flame-retardant clearcoat formulation according to claim 1, wherein the aqueous synthetic resin formulation is a melamine-formaldehyde resin, a urea-formaldehyde resin, or a mixture of these.

8. The intumescent flame-retardant clearcoat formulation according to claim 1, wherein the aqueous synthetic resin formulation is an etherified melamine-formaldehyde resin, an etherified urea-formaldehyde resin, or a mixture of these.

9. The intumescent flame-retardant clearcoat formulation according to claim 1, wherein the intumescent flame-retardant clearcoat formulation has a phosphorus content after curing of 1% to 15% by weight.

10. The intumescent flame-retardant clearcoat formulation according to claim 1, wherein the intumescent flame-retardant clearcoat formulation has a phosphorus content after curing of 5% to 10% by weight.

11. The intumescent flame-retardant clearcoat formulation according to claim 1, wherein the further ingredients are dispersants, fillers, curing agents, thixotropic agents, plasticizers, acid donors, further flame retardants, surface auxiliaries, binders, or a mixture of these.

12. The intumescent flame-retardant clearcoat formulation according to claim 1, wherein the intumescent flame-retardant clearcoat formulation is transparent after application and drying.

13. The intumescent flame-retardant clearcoat formulation according to claim 1, wherein the intumescent flame-retardant clearcoat formulation is free of halogens.

14. A method for providing an intumescent coating or impregnation, comprising the step of contacting an article made of wood, wood material, veneer, plastic, building material, cellulose material, rubber, metal, synthetic or natural fiber fabric, textile, leather, or polyolefin with the intumescent flame-retardant clearcoat formulation according to claim 1.

15. An intumescent flame-retardant clearcoat formulation containing
   30% to 75% by weight of a nitrogen-containing aqueous synthetic resin formulation selected from a melamine-formaldehyde resin, a urea-formaldehyde resin, an etherified melamine-formaldehyde resin, an etherified urea-formaldehyde resin, and mixtures of these,
   20% to 45% by weight of a phosphoric partial ester,
   3% to 15% by weight of at least one polyol selected from pentaerythritol, dipentaerythritol, tripentaerythritol, polycondensates of pentaerythritol, mixtures of pentaerythritol-based esters, glycerol, oligomeric glycerol, xylitol, sorbitol, mannitol, isomalt, lactitol, glucitol, threitol, erythritol, arabitol, inositol, polyvinyl alcohol, ethylene oxide-propylene oxide polyols, and mixtures of these, and
   2% to 20% by weight of further ingredients,
wherein the phosphoric partial ester is a partial ester of polyphosphoric acid and at least 2 polyols, the polyols having an average hydroxyl group content of at least 40% by weight, calculated as the ratio of hydroxyl group molecular weight to total polyol molecular weight multiplied by 100%.

16. The intumescent flame-retardant clearcoat formulation according to claim 15, containing 40% to 60% by weight of the nitrogen-containing aqueous synthetic resin formulation,
30% to 40% by weight of the phosphoric partial ester,
5% to 10% by weight of the at least one polyol, and
5% to 15% by weight of the further ingredients.

17. The intumescent flame-retardant clearcoat formulation according to claim 15, wherein the nitrogen-containing aqueous synthetic resin formulation is selected from an etherified melamine-formaldehyde resin, an etherified urea-formaldehyde resin, and mixtures of these.

18. The intumescent flame-retardant clearcoat formulation according to claim 15, wherein the phosphoric partial ester is a partial ester of polyphosphoric acid and at least 2 polyols, the polyols having an average hydroxyl group content of at least 45% by weight, calculated as the ratio of hydroxyl group molecular weight to total polyol molecular weight multiplied by 100%.

19. The intumescent flame-retardant clearcoat formulation according to claim 15, wherein the at least one polyol is sorbitol.

20. The intumescent flame-retardant clearcoat formulation according to claim 15, wherein the intumescent flame-retardant clearcoat formulation has a phosphorus content after curing of 1% to 15% by weight.

* * * * *